3,502,779
PROCESS OF MUCOLYSIS
William E. Dye, Washington, D.C., and John K. Pollard, Jr., Pasadena, Calif., assignors to Calbiochem, Los Angeles, Calif., a corporation of California
No Drawing. Filed Aug. 18, 1966, Ser. No. 573,197
Int. Cl. A61k 27/00
U.S. Cl. 424—335           4 Claims

ABSTRACT OF THE DISCLOSURE

Mucus is liquified by contacting it with 1,4-dimercapto-2,3-dihydroxybutane.

---

This invention relates to a novel process of liquefying mucus, adaptable both for laboratory use and for the treatment of animals, including human beings.

The need frequently arises for an agent capable of liquefying mucus. For example, in laboratory analysis and examination of mucus from test animals, from human beings, and the like, such as sputum, nasal mucus, vaginal and cervical mucus, and the like, most analytical and examination techniques are facilitated by reducing the consistency of the mucus, which is designated herein by the general term "liquefication" or "mucolysis" without thereby being limited in any rheological fashion. In vivo liquefication of mucus is often a desirable and necessary therapeutic step, especially in disorders of the respiratory system, in vaginal ailments, and elsewhere. A number of agents have been proposed, but not all are entirely satisfactory. Thus, mucolytic enzymes may well interfere with subsequent tests on a specimen, and may not be well tolerated when used in treatment of an animal or human patient. Various non-enzyme mucolytic agents may also suffer from the same defects, and both types may further be incompatible with other useful constituents of therapeutic or analytical compositions.

An object of the present invention is to provide a closely related group of compounds, any of which or a mixture of which, is capable of prompt liquefication of mucus both in vitro and in vivo.

Other objects of the invention will appear as the description thereof proceeds.

Generally speaking and in accordance with illustrative embodiments of our invention, we contact mucus with 1,4-dimercapto-2,3-dihydroxybutane. This may be present in any of its stereo isomers or mixtures thereof, all of which are equivalents for the purposes of the invention. Quite minute amounts of the aforesaid substance suffice to bring about liquefication in a short time; from 0.01% to 0.1% by weight of the mucus contacted is a typical range, bringing about liquefication in a matter of one or a few minutes. Larger amounts, such as 1% or 2%, may of course also be used, but generally are wasteful. It will be recognized by those skilled in the art that 1,4-dimercapto-2,3-dihydroxybutane is capable of existence in three stereo isomers and one racemic mixture, quite analogous to tartaric acid which indeed has the same structure except for the end groups. The isomer analogous to meso-tartaric acid may be termed 1,4-dithioerythritol; and the optically active isomers as D- and L-1,4-dithiothreitol, the latter of course being a racemic mixture by the normal methods of preparation. The substances used in accordance with the invention may be prepared by known methods, such as that set forth by Evans et al., J. Chem. Soc. 248–55, 1949. The various isomers are solids, freely soluble in water, glycerol, ethanol, and the like, the melting points of the threo-isomers being about 40° C. and that of the erythro-isomer being about 83° C.

Where in vivo application is concerned, since the substance used in accordance with the invention is a solid, although water soluble, it is desirable to prepare a dilute solution, preferably in water, and preferably adjusted to a pH within the range of about 6.5 to 7.5, such a solution being adapted to spraying with an atomizer, nebulizer, or the like. The usual preservatives, anti-oxidants, and the like may be used in such a solution as will be described in greater detail hereinbelow. Preparations in powder form, adapted for insufflation, dusting, and the like are also within the scope of our invention.

The substance may also be applied in the form of a pressurized aerosol, using fluorinated hydrocarbons as preferred propellants, as is common with spray applicators of this type. When so employed, the substance may be suspended as a powder in the aerosol propellant, or dissolved in a solvent compatible with the intended use.

Where in vitro use is concerned, the substance may likewise be used in aqueous solution, and most applications for which in vitro liquefication is employed permit the use of a higher alkalinity, such as, for example, as supplied by an approximately 2% sodium hydroxide solution which materially aids the liquefaction process.

It should be mentioned, however, that the substance in accordance with the invention exhibits excellent mucolytic behavior at a neutral pH, viz, 7.0, and indeed as already noted, even somewhat below 7.0. This is in contrast to a prior art mucolytic agent, acetyl cysteine, which requires a pH definitely on the alkaline side for its effectiveness. The advantage of being able to work at neutrality, particularly when in vivo use is concerned, is obvious.

As an example of in vitro use, we give the following tests using dithiothreitol, in 0.5% solution with 2% sodium hydroxide, and 0.1 molar sodium citrate, using as control the same solution containing 0.5% N-acetyl-L-cysteine (NAC). In some of the tests, the concentration of the dithiothreitol was reduced to 0.15%, and it was observed that sputum liquefication was as good with that as with the N-acetyl-L-cysteine (NAC) at 0.5%. The smear and culture results are shown in Table 1.

TABLE 1.—SMEAR AND CULTURE FOR MYCOBACTERIA FOLLOWING SPUTUM DIGESTION-DECONTAMINATION WITH 2% SODIUM HYDROXIDE-0.1 M SODIUM CITRATE COMBINED WITH 0.5% N-ACETYL-L-CYSTEINE OR 0.5% TO 0.15% DITHIOTHREITOL

|  | N-acetyl-L-cysteine | Dithiothreitol | Number of sputums |
|---|---|---|---|
| Ziehl-Neelsen AFB Smear. | Positive | Positive | [1] 16 |
|  | do | Negative | 0 |
|  | Negative | Positive | [2] 11 |
|  | do | Negative | 11 |
| Total |  |  | 38 |
| Culture on 7H10 agar 3 weeks, 35° C., under 5% CO$_2$. | Positive | Positive | 34 |
|  | do | Negative | 0 |
|  | Negative | Positive | 0 |
|  | do | Negative | 3 |
|  | Contaminated | Contaminated | 1 |
| Total |  |  | 38 |

[1] Positive with both reagents.
[2] No AFB seen (negative) with NAC, AFB seen (positive) with DTT.

There were more positive smears with the dithiothreitol reagent in accordance with the invention and in general, the number and size of colonies were greater. The mycobacteria isolated included drug-susceptible and multiple drug-resistant tubercle bacilli, M. kansasii, and Battey-type bacilli.

It should be noted that the substance used in accordance with the invention is susceptible to fairly rapid oxidation in dilute aqueous solution, so that when so used, the solution should be made up fresh at or about the time of use; or made up in de-aerated water and promptly sealed in ampules and the like with the usual precautions being taken to prevent access of oxygen.

Some examples will now be given of aqueous solutions suitable for in vivo use, as for example, for treatment of the respiratory tract:

EXAMPLE 1

1,4-dimercapto-2,3-dihydroxybutane (racemic DL-dithiothreitol): 20 grams; distilled water: one liter.

EXAMPLE 2

Dithioerythritol: 20 grams; distilled water: one liter.

EXAMPLE 3

Dithiothreitol: 10 grams; dithioerythritol: 10 grams; distilled water: one liter.

EXAMPLE 4

Dithiothreitol: 15 grams; chlorobutanol: 2 grams; distilled water: one liter.

EXAMPLE 5

Dithiothreitol: 20 grams; ephedrine sulphate: 10 grams; chlorcyclizin: 10 grams; chlorobutanol: 10 grams; distilled water: one liter.

It will be understood that while we have illustrated our invention with the aid of numerous specific examples, considerable variations in relative proportions, dosage, and technique of administration is possible within the broad scope of our invention.

Having described our invention, we claim:

1. In a process of liquefication of mucus, the step which comprises contacting said mucus with 1,4-dimercapto-2,3-dihydroxybutane in a liquefication-effective amount.

2. The process in accordance with claim 1 wherein said 1,4-dimercapto-2,3-dihydroxybutane is selected from the group consisting of D-1,4-dithiothreitol, L-1,4-dithiothreitol, 1,4-dithioerythritol and mixtures thereof.

3. The process in accordance with claim 1 wherein said 1,4-dimercapto-2,3-dihydroxybutane is present in a weight ratio of between about 1/100 percent to about 2 percent based upon the total weight of said mucus.

4. The process in accordance with claim 2 wherein said 1,4-dimercapto-2,3-dihydroxybutane is present in a weight ratio of between about 1/100 percent to about 2 percent based upon the total weight of said mucus.

References Cited

Evans et al., Chemical Society Journal, pp. 248–55, 1949.

ALBERT T. MEYERS, Primary Examiner

D. M. STEPHENS, Assistant Examiner